UNITED STATES PATENT OFFICE.

THOMAS L. WILLSON, OF BROOKLYN, NEW YORK.

PROCESS OF MANUFACTURING HYDROCARBON GAS.

SPECIFICATION forming part of Letters Patent No. 563,528, dated July 7, 1896.

Application filed February 28, 1894. Serial No. 501,763. (No specimens.)

*To all whom it may concern:*

Be it known that I, THOMAS L. WILLSON, a citizen of the United States, residing in Brooklyn, in the county of Kings and State of New York, have invented certain new and useful Improvements in the Manufacture of Hydrocarbon Gas, of which the following is a specification.

This invention relates to the production of acetylene, ($H_2C_2$.)

I have invented a new method for the production of acetylene in large quantities and at very moderate cost, such as opens up commercial uses for such gas which have been hitherto impracticable because of the great cost of its production.

My new process of manufacture consists, briefly, in first treating calcium oxid in the presence of carbonaceous matter, such as carbon or hydrocarbon, to the intense heat generated in an electric furnace, whereby the oxygen is withdrawn from the calcium and its place taken by carbon, forming a calcium carbid; and, second, combining water with this calcium carbid, thereby bringing about a mutual decomposition wherein the hydrogen of the water unites with the carbon of the carbid to form dihydrogen dicarbid, or acetylene, which escapes as gas. By this process the gas can be produced with great economy.

In carrying out my invention I employ any suitable sort of electric furnace, which may be a Siemens arc-furnace, and in its chamber I place lime and carbonaceous matter, and pass a powerful electric current through it in order to generate an enormous degree of heat. The lime may be quicklime in lumps or powder, and be mechanically mixed with carbon in the form of coal, or by slacking or hydrating the lime it may be more intimately combined with carbonaceous matter by stirring it into a liquid hydrocarbon, preferably coal-tar pitch kept liquid by heat. When the hydrocarbon has taken up all of the lime that it will, the mixture is dried by heat and placed in the furnace, or the lime and carbonaceous matter may be charged into the furnace from time to time or in alternation during the electric-smelting operation, or, instead of introducing separate carbonaceous matter, the heavy carbon pencils or slabs of the furnace may be relied upon as the source of carbon, although this is disadvantageous because less economical than to provide carbon in the other forms named. The treatment in the furnace deoxidizes the lime, the oxygen escaping as carbon-monoxid or carbon-dioxid gas, and the calcium thus set free enters into a new combination with the carbon, forming a calcium carbid, the formula for which is believed to be $CaC_2$. This material may be tapped out of the furnace at a white heat, or may be removed at the close of the operation. When cooled, it is of friable character, being easily broken, having an iron-gray or bluish-gray color in the pure state. Its affinity for water is so strong that if left exposed to the air it gradually crumbles to powder, its surface turning to a whitish gray by the formation of lime by oxidation. It is consequently necessary, if the material is to be preserved for some time, to inclose it in vessels from which all moisture is excluded, or to keep it beneath the surface of oil, or otherwise to protect it from moisture.

In carrying out the second step of my invention I take a bath of water and drop the calcium carbid into it in suitable quantities from time to time, catching the generated gas by any suitable closed vessel and conducting it to any suitable gasometer or gas-holder. Upon dropping the calcium carbid into the water a violent decomposition takes place, accompanied by the evolution of large quantities of acetylene gas, and leaving a residue of hydrated calcium oxid, the reaction being believed to be $CaC_2 + (H_2O)_2 = C_2H_2 + Ca(HO)_2$. Approximately 5.5 cubic feet of acetylene is produced per pound of calcium carbid, the proportion varying according to the purity of the carbide, which is liable to contain carbon or graphite and sometimes lime as impurities.

The acetylene gas thus produced may be employed as a raw material, from which many chemical products of great value in the arts may be derived. Because of its cheapness it promises to supersede many of the present processes of manufacture of various hydrocarbon products.

In carrying out the third step of my invention for the production of a superior illuminating or heating gas from the acetylene I make a mixture of atmospheric air therewith in any desired proportion, such as will give the character of gas desired for any particular purpose. The admixture of these ingredients may be performed in any suitable known apparatus employed for such purpose.

The acetylene gas produced according to my invention has also an important utilization as a means for enriching "water-gas," so called, or producer-gas, or any other known illuminating-gas, in order to impart to it the desired illuminating properties. The proportion required can only be determined in each case by experiment with different admixtures.

It is obvious that though the production of the calcium carbid and its conversion by means of water into acetylene may be immediately consecutive, yet frequently this will not be desirable, but the calcium carbid may be produced in one place and the acetylene consumed elsewhere. In this case the intermediate step of my process of protecting the calcium carbid from the action of the moisture of the air is practically essential and constitutes, therefore, a step of my process when a material time interposes between the production of the calcium carbid and its conversion into acetylene.

I do not in this application claim, broadly, the process of converting calcium carbid into illuminating-gas, having made a separate application therefor, filed on the 9th day of July, 1894, Serial No. 517,008, the present application being limited to the preliminary step of the production of said calcium carbid by means of the electric current and its conversion into acetylene.

I claim—

1. The herein-described process of producing and utilizing a calcium compound, which consists in subjecting mingled lime and a carbonaceous deoxidizing agent to the heat of an electric arc in an electric furnace, the carbonaceous matter being in excess of that required to combine with the freed oxygen, whereby the liberated calcium combines with the excess of carbon to form a calcium carbid, and finally mutually decomposing such carbid with water to generate a hydrocarbon gas, substantially as described.

2. The herein-described process of producing and utilizing a calcium compound, which consists in subjecting mingled lime and a carbonaceous deoxidizing agent to the heat of an electric arc in an electric furnace, the carbonaceous matter being in excess of that required to combine with the freed oxygen, whereby the liberated calcium combines with the excess of carbon to form a calcium carbid; secondly, preserving said calcium carbid against the action of the moisture of the atmosphere, or other moisture upon it, until it is desired to utilize the same; and, thirdly, mutually decomposing said calcium carbid with water, thereby producing acetylene, substantially as described.

In witness whereof I have hereunto signed my name in the presence of two subscribing witnesses.

THOMAS L. WILLSON.

Witnesses:
GEORGE H. FRASER,
FRED WHITE.